United States Patent [19]

Norton et al.

[11] 3,891,934

[45] June 24, 1975

[54] TRANSISTOR AMPLIFIER WITH IMPEDANCE MATCHING TRANSFORMER

[75] Inventors: David E. Norton, Framingham, Mass.; Allen F. Podell, Los Altos, Calif.

[73] Assignee: Adams-Russell Co., Inc., Waltham, Mass.

[22] Filed: May 22, 1974

[21] Appl. No.: 472,281

[52] U.S. Cl. ...................... 330/21; 330/19; 330/26; 330/165; 330/188; 330/195

[51] Int. Cl. .............................................. H03f 3/04

[58] Field of Search ............. 330/12, 19, 21, 22, 40, 330/165, 188, 195

[56] References Cited

UNITED STATES PATENTS

| | | | |
|---|---|---|---|
| 2,691,077 | 10/1954 | Koros | 330/40 X |
| 2,701,281 | 2/1955 | DeWhite et al. | 330/12 X |

*Primary Examiner*—R. V. Rolinec
*Assistant Examiner*—Lawrence J. Dahl
*Attorney, Agent, or Firm*—Charles Hieken, Esq.; Jerry Cohen, Esq.

[57] ABSTRACT

An amplifier includes a transistor and transformer having a primary winding and a tapped secondary winding. The primary winding is connected in series between the input terminal and the transistor emitter. The transistor base and one end of the secondary winding is grounded. The other end of the secondary winding is connected to the transistor collector. The transformer secondary tap is connected to an output terminal. The ratio of that portion of the secondary turns connected between the tap and *r-f* ground and the primary turns is $m$. The ratio of that portion of the secondary turns connected between the tap and the transistor collector and the primary turns is $n$. For two-way impedance match between a source resistance $R_s$ and a load resistance $R_L$, $n = m^2 (R_s/R_L)-m-1$.

8 Claims, 5 Drawing Figures

1

TRANSISTOR AMPLIFIER WITH IMPEDANCE MATCHING TRANSFORMER

BACKGROUND OF THE INVENTION

The present invention relates in general to ampifying and more particularly concerns a novel amplifier with high dynamic range and efficiency especially useful in matching both a source impedance and a load impedance while providing *r-f* amplification over a relatively broad band with a single transformer and single transistor.

CATV coaxial cable systems that transmit and amplify television signals use many amplifiers representing a significant cost of the system. To avoid reflections that cause undesirable visible ghosts on a television screen, care is taken to properly terminate the transmission lines. Thus, both the input and output of an amplifier should match that of the transmission line to which it is connected. While techniques for achieving this result are known, conventional prior art circuits involve many components that are relatively costly to acheive this result.

Still another problem arises from the range of signal levels to be amplified. It is difficult to amplify low level signals adequately and avoid overloading the amplifier with high level signals. Furthermore, dissipation of *r-f* power in amplifying circuit resistors reduces efficiency.

Accordingly, it is an important object of this invention to provide an economical low-noise *r-f* amplifier with high dynamic range and efficiency capable of conveniently matching both a source impedance and a load impedance while providing good amplification over a relatively broad bandwidth.

It is another object of the invention to achieve the preceding object with relatively few components.

It is a further object of the invention to achieve one or more of the preceding objects with relatively few components, none of which need be adjusted once circuit design is complete.

It is still a further object of the invention to achieve one or more of the preceding objects with a circuit that has only one transistor and one transformer.

SUMMARY OF THE INVENTION

According to the invention, there is an amplifying device having control, input and output electrodes, such as a transistor having at least base, emitter and collector electrodes. Means are provided for effectively connecting at *r-f* the control electrode or base to a common or reference terminal. Transformer means having at least a primary winding and a tapped secondary winding has the primary winding coupled in series between an input terminal and the imput electrode or emitter and its secondary winding effectively coupled between the common terminal and the transistor collector. An output terminal is coupled to a tap between first and second portions of the transformer secondary winding, the first portion being coupled between the tap and the common terminal. The ratio of first portion turns to primary turns is m; of second portion turns to primary turns, *n*. Preferably $n = m^2(R_s/R_L) - m - 1$ where $R_s$ and $R_L$ are the source and load resistances to be matched at the input and output terminals, respectively.

Numerous other features, objects and advantages of the invention will become apparent from the following specification when read in connection with the accompanying drawing in which:

DETAILED DESCRIPTION OF PREFERRED EMBODIMENTS

Figure 1:
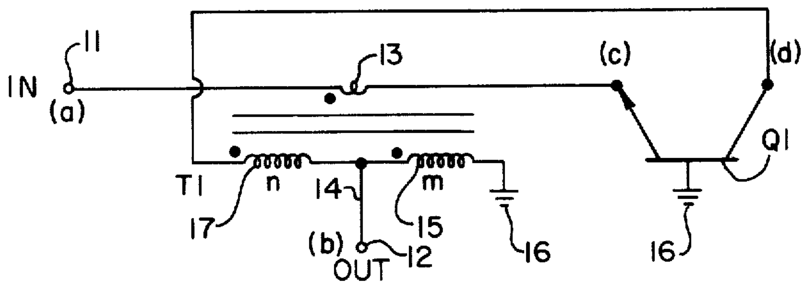
FIG. 1 is a schematic circuit diagram of an embodiment of the invention.

With reference now to the drawing and more particularly FIG. 1 thereof, there is shown a schematic circuit diagram of an embodiment of the invention for providing gain between input terminal 11 and output terminal 12 while matching a source impedance $R_s$ connected to input terminal 11 and a load impedance $R_L$ connected to output terminal 12. The circuit comprises transistors Q1 and transformer T1. So as not to obscure the principles of the invention the specific means for applying operating and biasing potentials to the particular circuit elements are not shown, those skilled in the art knowing how to supply these potentials. For example, the collector may recieve d-c operating potential through the secondary winding of transformer T1 from a d-c supply bypassed to ground by a suitable capacitor in a manner well-known in the art.

For convenience in the explanation which follows below input terminal 11, output terminal 12, the emitter and the collector are designated nodes *a*, *b*, *c* and *d*, respectively. The primary winding 13 is connected between input terminal 11 and the emitter. The secondary winding of transformer T1 has a tap 14 connected to output terminal 12 and a first portion 15 between tap 14 and ground, reference or common terminal 16 and a second portion 17 between tap 14 and the transistor collector. The base of transistor Q1 is effectively connected to ground terminal 16. The winding polarities are indicated by the dots.

Figure 2:
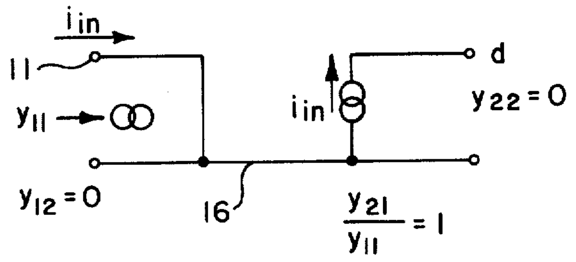
FIG. 2 is a representation of the transistor as an ideal common base circuit with various admittance parameters.

Referring to FIG. 2, transistor Q1 is represented as an ideal common base circuit having an input admittance $y_{11}$ between base and emitter that is infinite, and output admittance $y_{22}$ between collector and ground that is zero, a reverse transfer admittance $y_{12}$ that is zero and a ratio of forward transfer admittance $y_{21}$ to input admittance $y_{11}$ that is unity.

Figure 3:
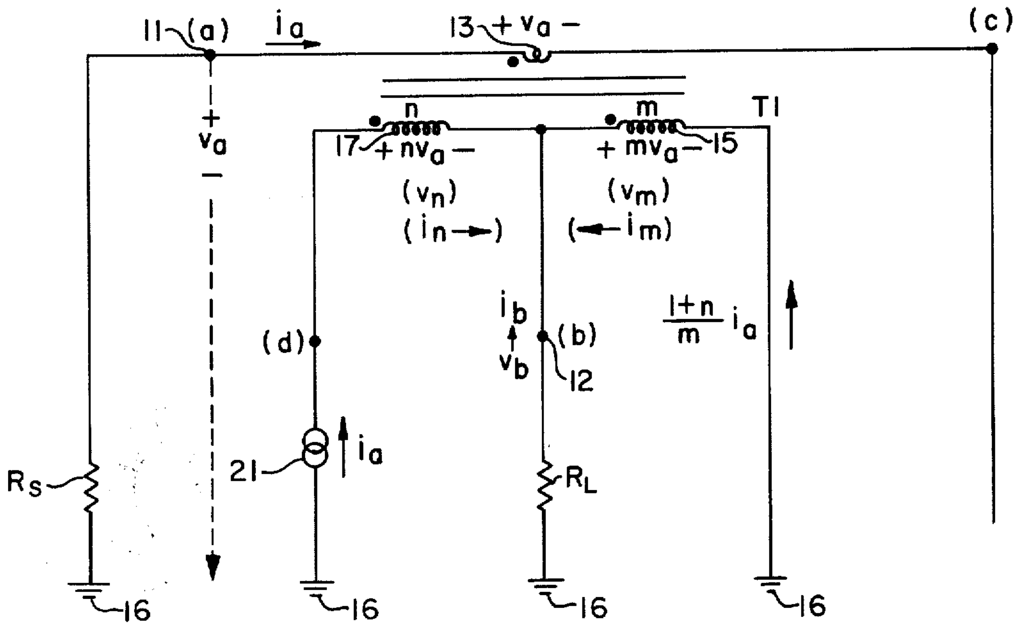
FIG. 3 is an equivalent circuit of the circuit of FIG. 1 helpful in understanding the mode of operation.

Referring to FIG. 3, there is shown an ideal equivalent circuit of the amplifier with a source resistance $R_s$ connected between input terminal 11 and ground 16, a load resistance $R_L$ connected between output terminal 12 and ground 16, and transistor Q1 represented as an ideal current source 21 connected between ground 16 and node d delivering the same current $i_a$ into node *d* that enters node a and produces a potential $v_a$ across primary winding 13. Voltages across portions 17 and 15 and the currents flowing in the various leads are as indicated in FIG. 3.

The following relationships hold:

$$v_n = nv_a \tag{1}$$

$$v_m = mv_a \tag{2}$$

$$i_a + ni_n = mi_m \tag{3}$$

Since $a$ flows through both the single primary turn and the $n$ turns, then $$i_m = [(1+n/m]\, i_a$$

With the transformer ideal, and the dependent current generator at node $d$, the following relationships hold:

$$v_b = mv_a \tag{4}$$

$$i_b = -(i_n + i_m)$$
$$i_b = -[(m + n + 1)/m]\, i_a \tag{5}$$

Hence $$v_b\, i_b = -(m + n + 1)\, i_a v_a \tag{6}$$

$$v_b/i_b = -[m^2/(m+n+1)]\, v_a/i_a \tag{7}$$

With a voltage source in series with source resistance $R_s$, $i_b$ flows outward into $R_L$, and $$v_b/i_b = -R_L \tag{8}$$

Hence from (7)

$$v_a/i_a = [(m+n+1)/m^2]\, R_L = R_{in} \tag{9}$$

With a voltage source in series with $R_L$, $i_a$ flows outward into $R_s$, and $$v_a/i_a = -R_s \tag{10}$$

Hence from (7)

$$v_b/i_b = [m^2/(m+n+1)]R_s = R_{out} \tag{11}$$

The input impedance matches the source resistance $R_s$ if $m$ and $n$ are related by $$R_{in} = R_s = [(m+n+1)/m^2]R_L \tag{12}$$

If this expression for $R_s$ is substituted in equation (11), $R_{out} = R_L$, the desirable situation of two-way impedance match. Rewriting equation (12) to relate $m$ and $n$ for two-way impedance match, $$n = m^2(R_s/R_L) - m - 1 \tag{13}$$

Note that if $m$ is an integer and $R_s$ and $R_L$ are related so that $m^2(R_s/R_L)$ is also an integer, then $n$ will also be an integer.

It is assumed that equation (13) is satisfied from here on. With a voltage source, $v$, in series with $R_s$, then the available power at the input is $$P_{av_a} = v^2/4R_s \tag{14}$$

But with equation (13) satisfied, the input is matched and $$v_a = v/2 \text{ and } P_{av_a} = v_a i_a \tag{15}$$

The power delivered to the load at node $b$ is $$P_b = -v_b i_b = (m+n+1)\, P_{av_a} \tag{16}$$

The transducer gain G is the ratio of:

$$P_b/P_{av_a} = G = m+n+1 = m^2(R_s/R_L) \tag{17}$$

Likewise with the generator at node $b$ we have $$P_{av_b} = v^2/4R_L,\ v_b = v/2 \text{ and } v_b i_b = P_{av_b}$$

Hence:

$$P_a = -v_a i_a = [1/(m+n+1)]P_{av_b} \tag{18}$$

and the reverse gain $G_r$ is given by $$P_a/P_{av_b} = G_r = 1/G \tag{19}$$

With the source at node a the load impedance, $R_{Lc}$, presented to the collector is $$R_{Lc} = v_d/i_a = [(n+m)\, v_a]/i_a \tag{20}$$

but $v_a/i_a = R_s$. Hence:

$$R_{Lc} = (n+m)\, R_s \tag{21}$$

Figure 4:
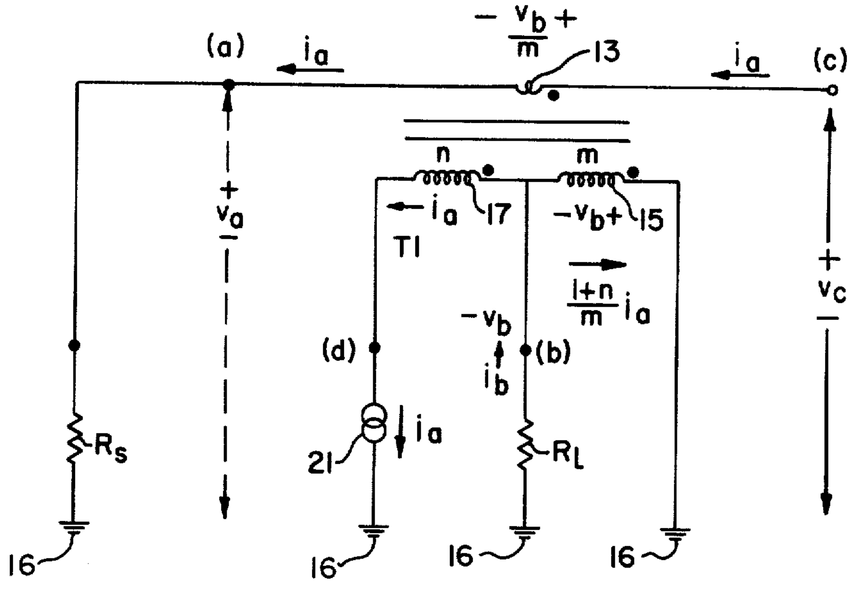
FIG. 4 is the circuit of FIG. 3 redrawn to help determine the source impedance presented to the emitter.

Referring to FIG. 4, the equivalent circuit of FIG. 3 is redrawn to facilitate determining the source impedance presented to the emitter as seen looking in at the emitter feed point between node c and ground 16. Assuming that node c is positive with respect to ground, the voltages and currents are as indicated in FIG. 4 and the following relationships occur.

$$R_{se} = v_c/i_a = [v_a+(v_2/m)]/i_a \tag{22}$$

$$v_a = i_a R_s;\ v_b = i_b R_L \tag{23}$$

$$i_b = [(m+n+1)/m]i_a \quad (24)$$

Hence:

$$R_{se} = R_s + [(m+n+1)/m^2]R_L \quad (25)$$

But comparing equation (12) with equation (25) shows that $$R_{se} = 2R_s \quad (26)$$

In summary for two-way impedance match the following relationships occur:

| | | |
|---|---|---|
| Turns Ratio: | $n = m^2 (R_s/R_L) - m - 1$ | (13) |
| Forward Gain: | $G = m^2 (R_s/R_L)$ | (17) |
| Reverse Gain: | $G_r = 1/G$ | (19) |
| Collector Load Impedance: | $R_{Lc} = (n+m) R_s$ | (21) |
| Emitter Source Impedance: | $R_{se} = 2R_s$ | (26) |

Figure 5:
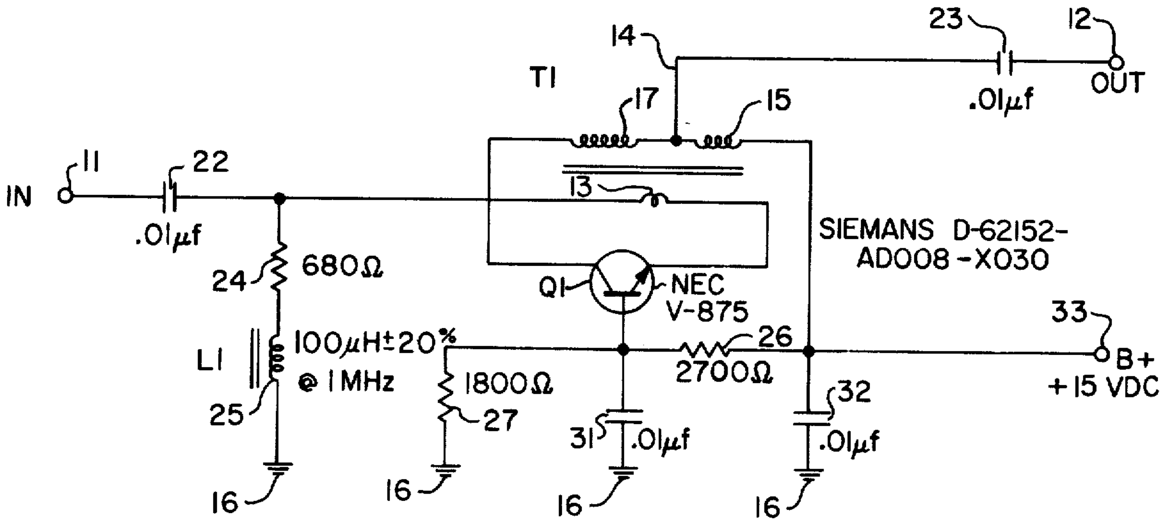
FIG. 5 is a schematic circuit diagram of a preferred embodiment of the invention.

Referring to FIG. 5, there is shown a schematic circuit diagram of a preferred embodiment of the invention showing typical parameter values. The same reference symbols identify corresponding elements throughout the drawing. FIG. 5 includes an input coupling capacitor 22, an output coupling capacitor 23, an emitter biasing resistor 24 in series with an *r-f* choke 25, biasing resistors 26 and 27, bypass capacitors 31 and 32 and B+ terminal 33. The circuit dissipates negligible *r-f* power. Resistors 24, 26 and 27 do not dissipate *r-f* power because negligible *r-f* current flows through them. Were transformer T1 and transistor Q1 ideal and lossless, there would be essentially no *r-f* power loss between input and output. Because of the nature of the circuit, the circuit dynamic range corresponds substantially to that of transistor Q1.

With the circuit of FIG. 5 and 10 ma. delivered into terminal 33 at 15 volts, the invention had a gain of 8dB± 0.25 dB from 5 to 350 MHz. For input and output impedance of 50 ohms the maximum VSWR was 1.5 from 5 to 100 MHz and 2 from 100 to 250 MHz. The maximum noise figure was 1.2 dB from 5 to 150 MHz and 1.5 dB from 150 to 200 MHz. The minimum power output at 1dB compression over 5 to 150 MHz was 10 dBm and from 150 to 200 MHz 9 dBm.

There has been described a novel *r-f* amplifying circuit characterized by matching source and load impedances and good amplification over a relatively broad bandwidth while using relatively few components, components that need not be adjusted and are relatively economical. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Amplifying apparatus comprising, amplifying means having at least control, input and output electrodes, a common terminal, transformer means having at least a primary and a secondary winding, said secondary winding having a tap intermediate to first and second portions thereof, an input terminal, an output terminal, means for coupling said output terminal to said tap, means for coupling said primary winding between said input terminal and said input electrode, said first portion being coupled between said tap and said common terminal, said second portion being coupled between said tap and said output electrode, and means for coupling said control electrode to said common terminal.

2. Amplifying apparatus in accordance with claim 1 wherein the turns ratio between said first portion and said primary winding is m and between said second portion and said primary winding is n with $n = m^2 R_s/R_L - m - 1$ wherein $R_s$ is a predetermined source resistance and $R_L$ is a predetermined load resistance.

3. Amplifying apparatus in accordance with claim 2 and further comprising said source resistance coupled between said input terminal and said common terminal and said load resistance coupled between said output terminal and said common terminal.

4. Amplifying apparatus in accordance with claim 1 wherein said amplifying means comprises a transistor and said control, input and output electrodes comprise base, emitter and collector electrodes, respectively.

5. Amplifying apparatus in accordance with claim 4 and further comprising, a source of d-c operating potential connected to said collector electrode through said secondary winding, and means for biasing said base and emitter electrodes.

6. Amplifying apparatus in accordance with claim 5 wherein the means for biasing said base electrode comprises a first resistor connected between said source of d-c potential and said base electrode and a second resistor connected between said base electrode and said common terminal and the means for coupling said base electrode to said common terminal comprises an *r-f* bypass capacitor and further comprising, another *r-f* bypass capacitor coupling said source of a d-c potential to said common terminal.

7. Amplifying apparatus in accordance with claim 6 wherein said means for biasing said emitter electrode comprises an emitter biasing resistor in series with an *r-f* choke between said common terminal and said primary winding.

8. Amplifying apparatus in accordance with claim 7 wherein said means for coupling said primary winding between said input terminal and said emitter electrode comprises a capacitor and said means for coupling said output terminal to said tap comprises a capacitor.

* * * * *